United States Patent Office 3,323,894
Patented June 6, 1967

3,323,894
METHOD OF WIDENING CROTCH ANGLES OF FRUIT TREES
Martin J. Bukovac, 2015 Brentwood Ave., East Lansing, Mich. 48823
No Drawing. Filed Nov. 14, 1966, Ser. No. 593,730
9 Claims. (Cl. 71—2.6)

ABSTRACT OF THE DISCLOSURE

The present invention relates to a method of modifying the growth characteristics of plants, and more particularly it relates to a method of widening crotch angles in fruit trees utilizing halogenated benzoic acid compounds. Wider crotch angles are desirable for purposes of strengthening tree framework so as to support large crops of mature fruit.

---

This application is a continuation-in-part of my co-pending patent application entitled: "Method of Widening Crotch Angles of Fruit Trees," Ser. No. 346,996, filed Feb. 24, 1964.

It is generally recognized that primary branches forming narrow angles with the main trunk produce structurally weak crotches. Such narrow crotch angles frequently break under moderate or heavy fruit cropping, and in so doing seriously reduce the productivity of the host tree. Frequently, entire trees are lost so far as productivity is concerned as a result of weakening and secondary infection directly attributed to breaking of branches at the crotch.

It is also recognized that trees having narrow crotch angles are prone to winter injury much more so than trees having wider crotch angles. As a result of such injuries and structural weakness fruit trees are frequently lost after the grower has made substantial investments in seeking to establish same, so that the most productive years of the tree's bearing cycle are never fully realized.

Experienced horticulturists have long stressed the importance of selecting wide angle scaffolds in training young fruit trees. It has been found that the critical limit for branch angles is about 45 degrees, and that primary branches forming angles less than 45 degrees are generally weak because of bark inclusion.

Thickening of the branch and trunk during early stages of tree growth is so rapid that the bark in the crotch is compressed before the angle can be filled out with tissue from the crotch cambium. The adjacent bark on the branch and trunk are thus pushed together and crushed by the tremendous pressure exerted during growth conditions. Eventually portions of the bark in the crotch are destroyed, portions may be pushed outward and still further portions become embedded into the crotch where new tissue growth ultimately surrounds it.

The embedded bark prevents the contiguous tissue of the branch and trunk from uniting and growing together. Decay frequently sets into the surrounded bark, and eventually extends to the surrounding tissue of the plant, thus further weakening the crotch.

The weakness of the crotch is not attributed to the acuteness of the angle, but rather to bark inclusion which is so likely to occur in the narrow angled crotches. Thus the greater the degree of bark inclusion, the weaker the crotch. By selecting crotches of varying angles from established fruit trees it has been shown that a force of 56 lbs. applied one foot from the trunk on a primary branch was sufficient to break a 30 degree crotch, whereas applying a force of 108 pounds one foot from the tree on a primary branch was required to break a 75 degree crotch.

Numerous means have been employed in an attempt to modify narrow angled crotches. Physical means such as tying branches down, placing "spreaders" between the main stem and lateral branches, or attaching weighted objects to the laterals have been used to cause wide angles to be formed. The merits of such practices are questionable. Usually, the labor costs are sufficiently high so as to prevent widespread use of such operations. Of greater importance, however, is the general ineffectiveness of such physical practices in producing strong crotches. Without question the lateral branches assume a more horizontal position and from cursory observation the crotch angles appear to have been widened. However, upon closer inspection it is readily seen that the crotch angle itself has not been markedly altered, but rather the change in branch direction occurred in internodes which were still capable of elongating, and these internodes are generally several nodes removed from the trunk or main stem. Moreover, it is difficult to apply these physical treatments sufficiently early in the development of a short bud in order to effect actual angle change in the resulting crotch.

With the foregoing in mind the principal object of the present invention may be said to reside in a method of chemically widening the crotch angles of fruit trees so as to strengthen the overall structure of such trees thereby permitting support of large fruit crops without danger of breakage of the branches.

These and other objects of the present invention become apparent from consideration of the following detailed disclosure.

The present invention is based upon the surprising discovery that if certain chemical agents, such as hereinafter defined, are applied to fruit trees during their early vegetative state of growth, but prior to the trees reaching the fruiting stage, the growth of such plants will be so altered that the crotch angles between the branches and limbs thereof will be sufficiently widened and thus strengthened so as to enable the tree to support large fruit crops during subsequent bearing years.

The chemical agents which have been found to be suitable for use in the process of the present invention are 2,3,5-trichlorobenzoic acid; 2,3,6-trichlorobenzoic acid; 2,3,5,6-tetrachlorobenzoic acid and 2,3,5-triiodobenzoic acid, as well as the functional derivatives such as their amines, amides, esters and salts.

Hereinafter in the specification, and in the claims appended hereto reference to one or more of the compounds 2,3,5-trichlorobenzoic acid; 2,3,6-trichlorobenzoic acid; 2,3,5,6-tetrachlorobenzoic acid and 2,3,5-triiodobenzoic acid will be understood as applying equally to the amide of each of such acids; to salts thereof, such as the sodium, potassium or ammonium salts; to amines thereof such as for example the alkyl amines containing up to 10 carbon atoms in each alkyl chain, and the alkanol amine salts thereof containing up to 3 carbon atoms in each alkanol chain; and esters thereof such as for example the lower alkyl esters containing from 1 to 10 carbon atoms, as well as the glycol ether esters typical of which are mono- and diethylene glycol esters. It is well recognized that the use of functional derivatives of hormone acids imparts the same general level of activity as do the parent acids, when the same level of active hormone agent is utilized.

Application of the compounds of this invention to fruit trees should be made so as to apply an amount of from 5 to 150 p.p.m. of such compound relative to the solution being sprayed upon the trees. Use of concentrations of less than about 5 p.p.m. produces no appreciable change in crotch angles on most varieties of fruit trees, so that this minimum concentration should be maintained in order to achieve the beneficial results of this invention. Conversely, where more than 150 p.p.m. of the compound, relative to the carrier, is employed it has been found that phytotoxic injury sometimes results to the vegetative portions of the plant. Concentrations of between 25 and 75 p.p.m. of the compound, relative to the carrier, have been found to provide consistently excellent results over a wide variety of fruit trees and thus represents the preferred usage.

Inasmuch as different fruit trees, as well as different varieties of a given species may vary in size, it is substantially impossible to determine the actual amount of active compound being applied to a tree in any particular instance. It has been found that if trees sought to be treated are sprayed until the trees are wet to run-off that the surprising results of this invention will be realized.

The time of application of the compounds of the present invention to fruit trees is important since it has been found that the surprising plant response disclosed herein is realized only when the chemicals are applied to immature trees during which time the general framework is being established before fruiting. Modification of the tree structure by changing branch crotch angle is accomplished during the first several years of the tree's growth, before the time when the tree is considered to be commercially capable of setting fruit to maturity.

It has been found that the preferred time of treatment by the process of the present invention is accomplished during the lateral shoot deevlopment stages. Moreover, it has been found that treatments by the process of the present invention may be accomplished in successive years if desired in order to achieve maximum crotch angle modifications.

So far as concerns formulation of the compounds found to be suitable for use in this invention certain of these compounds, or derivatives thereof, are soluble in aqueous media. For example, certain of the alkali metal and ammonium salts, and the lower alkyl and alkanol amine salts of the chlorinated or iodinated benzoic acids are sufficiently soluble in water so as to be capable of spraying in an aqueous solution. Certain other compounds, however, are substantially water insoluble and must be formulated in suitable organic solvents or agricultural oils prior to use. This latter type includes the parent acids; the amide of each acid; the esters thereof; and certain of the relatively high molecular weight amines, that is those containing alkyl chain lengths having from 6 to 10 carbon atoms. Inasmuch as the techniques for formulation of these halogenated benzoic acids are known in the argricultural industry, suffice it to say that the water insoluble formulations may be prepared in the usual manner, particularly with reference to the incorporation of emulsifying and/or wetting agents into such compositions where desirable.

The surprising features of this invention are set forth hereinbelow as applied to various varieties of apple trees. However, such presentations are not to be construed as in any way limiting the scope of this invention since this process has been found to be applicable to fruit trees generally, including such fruit crops as apple, cherry, peach, pear, prune and plum, and thus is not restricted to the treatment of the apple species.

*Example I*

Year-old apple trees of the Red Delicious type (Redspur strain) were sprayed until wet to run-off with aqueous solutions containing 30 and 50 p.p.m. of 2,3,5-triiodobenzoic acid (TIBA) equivalent. Spraying was effected during the spring season when the trees were in a vigorous state of growth. Observations were recorded by measuring crotch angles of the trees sprayed with the triiodobenzoic acid compound, and of one-year trees which were not subjected to any spraying. These results are summarized below in Table I.

TABLE 1

| Replication | Degree of Crotch Angle | | |
|---|---|---|---|
| | Control | TIBA, p.p.m. | |
| | | 30 | 50 |
| | Degrees | Degrees | Degrees |
| 1 | 49 | 81 | 65 |
| 2 | 45 | 62 | 65 |
| 3 | 39 | 57 | 59 |
| 4 | 22 | 55 | 90 |
| 5 | 28 | 64 | 59 |
| Average | 37 | 64 | 68 |

*Example II*

Year-old apple trees of the Red Delicious type (Evarts, Redspur and Wellspur strains) were sprayed with solutions containing 30 and 50 p.p.m. of 2,3,5-triiodobenzoic acid (TIBA) equivalent. Spraying was conducted during the spring growing season and was continued until the trees were wet to run-off with the aqueous solutions. Determinations of crotch angle formations on 100 limbs for each treatment of these treated trees were made and are recorded by way of comparison in Table II wherein the number of branches for each degree classification is shown in comparison with controls.

TABLE II

| Treatment | Degree of Crotch Angle | | | | | |
|---|---|---|---|---|---|---|
| | Below 31° | 31–40° | 41–50° | 51–60° | 61–70° | Above 70° |
| Control | 3 | 15 | 50 | 29 | 3 | 0 |
| 30 p.p.m. TIBA | 0 | 3 | 19 | 47 | 25 | 6 |
| 50 p.p.m. TIBA | 0 | 0 | 3 | 53 | 33 | 11 |

*Example III*

Two-year old apple trees of the Red Delicious type (Evarts strain) were sprayed until wet to run-off using aqueous solutions containing 50 p.p.m. of the respective chlorinated benzoic acid compounds as listed below in Table III. Spraying was effected during the spring season when the trees were in an active state of growth, and at the time of spraying lateral shoots on the apple trees were 4 to 5 inches in length. Observations of the effects of these compounds on crotch angles were obtained using actual angle measurements, and are reported below in Table III in comparison with control or untreated trees.

TABLE III

| Replication | Degree of Crotch Angle | | | |
|---|---|---|---|---|
| | Control (deg.) | 2,4,5-trichlorobenzoic acid (deg.) | 2,3,6-trichlorobenzoic acid (deg.) | 2,3,5,6-tetrachlorobenzoic acid (deg.) |
| 1 | 60.7 | 60.2 | 80.0 | 61.7 |
| 2 | 55.5 | 80.3 | 89.0 | 78.5 |
| 3 | 60.2 | 74.3 | 88.0 | 86.0 |
| 4 | 48.1 | 78.0 | 86.0 | 75.6 |
| Average | 56.1 | 73.2 | 85.9 | 75.5 |

It is evident from the data reported in Tables I, II and III above that widening of the crotch angles of fruit trees is accomplished in accordance with the process of the present invention, thereby providing for selection of wide angled laterals which, in future bearing years, will be more able to support the weight of mature fruit.

What is claimed as the invention is:

1. A method of widening the crotch angles of fruit trees which comprises spraying on immature fruit trees a chlorinated benzoic acid compound selected from the group consisting of 2,4,5-trichlorobenzoic acid; 2,3,6-trichlorobenzoic acid; and 2,3,5,6-tetrachlorobenzoic acid, said acid compound being applied during the vegetative development stage and before the trees reach the fruiting stage in a concentration sufficient to widen crotch angles without causing phytotoxic effects.

2. The method of claim 1 wherein the benzoic acid compound is admixed with a carrier in a concentration of between 5 and 150 parts of the acid compound to one million parts of the carrier and the mixture is sprayed on the trees.

3. The method of claim 1 wherein the benzoic acid compound is admixed with a carrier in a concentration of between 25 and 75 parts of the acid to one million parts of the carrier and the admixture is sprayed on the trees.

4. The method of claim 1 wherein the fruit tree is apple.
5. The method of claim 1 wherein the fruit tree is cherry.
6. The method of claim 1 wherein the fruit tree is pear.
7. The method of claim 1 wherein the fruit tree is peach.
8. The method of claim 1 wherein the fruit tree is prune.
9. The method of claim 1 wherein the fruit tree is plum.

References Cited
UNITED STATES PATENTS 2,978,838  4/1961  Beatty _____ 71—2.6 X LEWIS GOTTS, *Primary Examiner.*

JAMES O. THOMAS, JR., *Examiner.*